United States Patent
Shi et al.

(10) Patent No.: US 12,302,281 B2
(45) Date of Patent: May 13, 2025

(54) APPARATUS AND METHOD OF WIRELESS COMMUNICATION

(71) Applicant: GUANGDONG OPPO MOBILE TELECOMMUNICATIONS CORP., LTD., Dongguan (CN)

(72) Inventors: Cong Shi, Dongguan (CN); Haitao Li, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 530 days.

(21) Appl. No.: 17/547,679

(22) Filed: Dec. 10, 2021

(65) Prior Publication Data
US 2022/0104173 A1    Mar. 31, 2022

Related U.S. Application Data

(63) Continuation of application No. PCT/CN2020/129841, filed on Nov. 18, 2020.
(Continued)

(51) Int. Cl.
*H04W 68/00* (2009.01)
*H04W 4/14* (2009.01)
(Continued)

(52) U.S. Cl.
CPC .......... *H04W 68/005* (2013.01); *H04W 4/14* (2013.01); *H04W 24/08* (2013.01); *H04W 72/23* (2023.01)

(58) Field of Classification Search
None
See application file for complete search history.

(56) References Cited

U.S. PATENT DOCUMENTS

2013/0229965 A1   9/2013  Bressanelli et al.
2016/0112990 A1*  4/2016  Cave ................ H04W 52/0209
                                                           370/328
(Continued)

FOREIGN PATENT DOCUMENTS

CN    102833734 A    12/2012
CN    103124399 A     5/2013
(Continued)

OTHER PUBLICATIONS

International Search Report and the Written Opinion Dated Jan. 22, 2021 From the International Searching Authority Re. Application No. PCT/CN2020/129841, 9 pages.
(Continued)

*Primary Examiner* — Kodzovi Acolatse
*Assistant Examiner* — Anindita Sen
(74) *Attorney, Agent, or Firm* — BAYES PLLC

(57) ABSTRACT

An apparatus and a method of wireless communication are provided. The method by a user equipment (UE) includes being configured with one or more additional paging monitoring occasions from a base station and if the UE detects a radio network temporary identifier (RNTI) addressed downlink channel in a downlink channel paging monitoring occasion from the base station, the UE determines whether to stop monitoring the one or more additional paging monitoring occasions. This can solve issues in the prior art, improve an issue of increasing in signaling or sub-optimal UE power savings, provide a good communication performance, and/or provide high reliability.

7 Claims, 2 Drawing Sheets

300 →

302 → Configuring one or more additional paging monitoring occasions to a user equipment (UE)

304 → If the UE detects a radio network temporary identifier (RNTI) addressed downlink channel in a downlink channel paging monitoring occasion from the base station, the UE determines whether to stop monitoring the one or more additional paging monitoring occasions

Related U.S. Application Data

(60) Provisional application No. 62/937,222, filed on Nov. 18, 2019.

(51) Int. Cl.
*H04W 24/08* (2009.01)
*H04W 72/23* (2023.01)

(56) References Cited

U.S. PATENT DOCUMENTS

| | | | | |
|---|---|---|---|---|
| 2019/0313263 | A1* | 10/2019 | Jung | H04W 80/02 |
| 2020/0092918 | A1* | 3/2020 | Lee | H04W 72/23 |
| 2021/0127356 | A1* | 4/2021 | Agiwal | H04W 72/23 |
| 2021/0298029 | A1* | 9/2021 | Liu | H04W 72/0453 |
| 2022/0095270 | A1* | 3/2022 | Shih | H04W 76/11 |

FOREIGN PATENT DOCUMENTS

| | | | |
|---|---|---|---|
| CN | 105898867 | A | 8/2016 |
| CN | 110063030 | A | 7/2019 |
| EP | 3979675 | A1 | 4/2022 |
| WO | 2016144082 | A1 | 9/2016 |
| WO | 2018233587 | A1 | 12/2018 |
| WO | 2019099661 | A1 | 5/2019 |

OTHER PUBLICATIONS

The First Office Action dated Apr. 4, 2023 from Chinese patent application No. 202210225151.1.
The supplementary European Search Report Dated Jul. 22, 2022 from European Application No. 20888943.6.
OPPO: "Paging enhancements in NR-U", R2-1905616, 3GPP TSG-RAN WG2 Meeting #106 Reno, USA, May 13-May 17, 2019.
Intel Corporation: "Paging enhancement for NR-U", R2-1906275, 3GPP TSG-RAN WG2 106 Reno, USA, May 13-17, 2019.
OPPO: "Stopping criteria for paging monitoring", R2-1914406, 3GPP TSG-RAN WG2 Meeting #108 Reno, Nevada, US, Nov. 18-22, 2019.
Nokia et al: "Paging in NR-U", R2-1915058, 3GPP TSG-RAN WG2 Meeting #108 Reno, USA, Nov. 18-22, 2019.
Vivo: "Remaining Issues of Paging Enhancements for NR-U", R2-1903082, 3GPP TSG-RAN WG2 Meeting #105bis Xi'an, China, Apr. 8-12, 2019.
The supplementary European search report dated Dec. 11, 2023 from European patent application No. 23185421.7.
The Notice of Allowance dated Jun. 20, 2023 from Chinese patent application No. 202210225151.1.

\* cited by examiner

APPARATUS AND METHOD OF WIRELESS COMMUNICATION

CROSS REFERENCE TO RELATED APPLICATION

This application is a continuation of International Application No. PCT/CN2020/129841 filed on Nov. 18, 2020, which claims priority to a U.S. application No. 62/937,222 filed on Nov. 18, 2019. The entire disclosures of above applications are incorporated herein by reference.

BACKGROUND OF DISCLOSURE

1. Field of the Disclosure

The present disclosure relates to the field of communication systems, and more particularly, to an apparatus and a method of wireless communication, which can provide a good communication performance and/or high reliability.

2. Description of the Related Art

Wireless communication systems are widely deployed to provide various types of communication content such as voice, video, packet data, messaging, broadcast, and so on. These wireless communication systems may be capable of supporting communication with multiple users by sharing available system resources (e.g., time, frequency, and power).

Examples of such multiple-access systems include fourth generation (4G) systems such as long term evolution (LTE) systems and fifth generation (5G) systems which may be referred to as new radio (NR) systems.

A wireless multiple-access communications system may include a number of base stations or network access nodes, each simultaneously supporting communication for multiple communication devices, which may be otherwise known as user equipments (UEs).

A wireless communication network may include a base station that can support communication for a UE. The UE may communicate with the base station via downlink and uplink.

The downlink refers to a communication link from the base station to the UE, and the uplink refers to a communication link from the UE to the base station. In the wireless communication system operating in high frequency bands, paging transmission/reception leads to increased signaling overhead and UE power consumption.

Therefore, there is a need for an apparatus (such as a user equipment (UE) and/or a base station) and a method of wireless communication, which can solve issues in the prior art, improve an issue of increasing in signaling or sub-optimal UE power savings, provide a good communication performance, and/or provide high reliability.

SUMMARY

An object of the present disclosure is to propose an apparatus (such as a user equipment (UE) and/or a base station) and a method of wireless communication, which can solve issues in the prior art, improve an issue of increasing in signaling or sub-optimal UE power savings, provide a good communication performance, and/or provide high reliability.

In a first aspect of the present disclosure, a method of wireless communication by a user equipment (UE), comprising being configured with one or more additional paging monitoring occasions from a base station and if the UE detects a radio network temporary identifier (RNTI) addressed downlink channel in a downlink channel paging monitoring occasion from the base station, the UE determines whether to stop monitoring the one or more additional paging monitoring occasions.

In a second aspect of the present disclosure, a method of wireless communication by a base station comprising configuring one or more additional paging monitoring occasions to a user equipment (UE) and if the UE detects a radio network temporary identifier (RNTI) addressed downlink channel in a downlink channel paging monitoring occasion from the base station, the UE determines whether to stop monitoring the one or more additional paging monitoring occasions.

In a third aspect of the present disclosure, a user equipment comprises a memory, a transceiver, and a processor coupled to the memory and the transceiver.

The processor is configured with one or more additional paging monitoring occasions from a base station and if the processor detects a radio network temporary identifier (RNTI) addressed downlink channel in a downlink channel paging monitoring occasion from the base station, the processor determines whether to stop monitoring the one or more additional paging monitoring occasions.

In a fourth aspect of the present disclosure, a base station comprises a memory, a transceiver, and a processor coupled to the memory and the transceiver.

The processor is configured to configure one or more additional paging monitoring occasions to a user equipment (UE) and if the UE detects a radio network temporary identifier (RNTI) addressed downlink channel in a downlink channel paging monitoring occasion from the base station, the UE determines whether to stop monitoring the one or more additional paging monitoring occasions.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
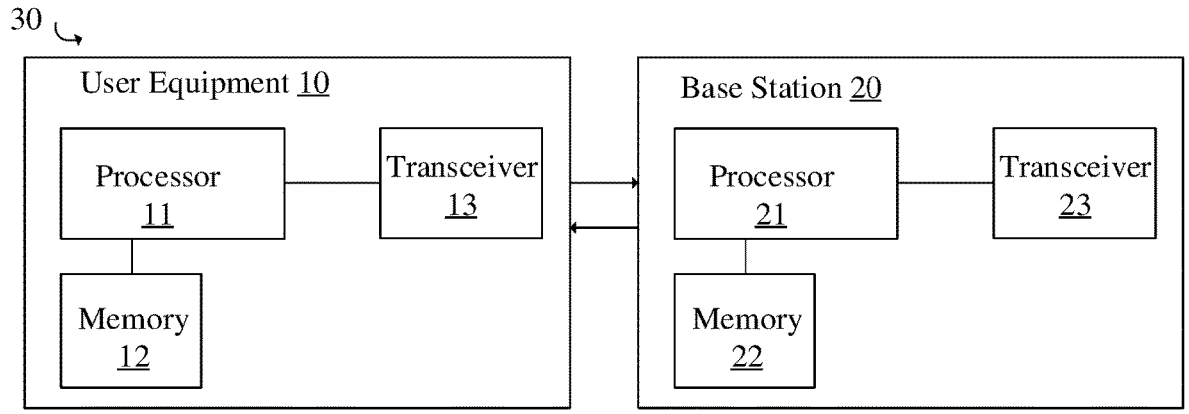
FIG. 1 is a block diagram of one or more user equipments (UEs) and a base station of wireless communication in a communication network system according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

An unlicensed spectrum is a shared spectrum. Communication equipments in different communication systems can use the unlicensed spectrum as long as the unlicensed meets regulatory requirements set by countries or regions on a spectrum. There is no need to apply for a proprietary spectrum authorization from a government.

In order to allow various communication systems that use the unlicensed spectrum for wireless communication to coexist friendly in the spectrum, some countries or regions specify regulatory requirements that must be met to use the unlicensed spectrum.

For example, a communication device follows a listen before talk (LBT) procedure, that is, the communication device needs to perform a channel sensing before transmitting a signal on a channel. When an LBT outcome illustrates that the channel is idle, the communication device can perform signal transmission; otherwise, the communication device cannot perform signal transmission. In order to ensure fairness, once a communication device successfully occupies the channel, a transmission duration cannot exceed a maximum channel occupancy time (MCOT).

On an unlicensed carrier, for a channel occupation time obtained by a base station, it may share the channel occupation time to a user equipment (UE) for transmitting an uplink signal or an uplink channel.

In other words, when the base station shares its own channel occupancy time with the UE, the UE can use an LBT mode with higher priority than that used by the UE itself to obtain the channel, thereby obtaining the channel with greater probability. An LBT is also called a channel access procedure. UE performs the channel access procedure before the transmission, if the channel access procedure is successful, i.e., the channel is sensed to be idle, the UE starts to perform the transmission. If the channel access procedure is not successful, i.e., the channel is sensed to be not idle, the UE cannot perform the transmission.

In a current discussion, the following is agreed for a paging procedure in a new radio unlicensed spectrum (NR-U): A UE can be configured for an additional number of monitoring occasions at or after or before (further for study, FFS) its calculated paging occasion (PO) (when a paging message is transmitted). dynamic extension and dynamic termination are further for study.

In a current discussion, the following is further agreed: As a starting point: If a UE receives on a physical downlink control channel (PDCCH) addressed to a paging radio network temporary identifier (P-RNTI) in a PDCCH monitoring occasion for paging corresponding to a synchronization signal block (SSB) in a PO, the UE is not required to monitor subsequent PDCCH monitoring occasions corresponding to the SSB in the PO.

In a current discussion, the following is further agreed: A UE should also stop monitoring paging for a PO even if it does not decode a P-RNTI if it can detect that a gNB had access to a channel at a PDCCH monitoring occasion. FFS: if there are additional detection methods to detection of the P-RNTI and what those are.

Channel occupancy and more specifically an inability to acquire the channel during the UE's POs, can increase an over-all paging latency in NR-U compared to NR. Increasing opportunities for a UE to receive a page can be done by either increasing the number of POs or the number of PDCCH monitoring occasions within POs. However, dimensioning such additional PDCCH occasions becomes an important trade-off between UE reachability and UE power consumption.

In cases where the channel occupancy is low, a current NR operation is sufficient for paging. However, channel occupancy is not deterministic and could change dynamically. Monitoring extra PDCCH occasions in a PO is beneficial in cases of high channel occupancy, giving more chances for a UE to be paged within a paging cycle and thus reducing any increase in paging latency caused by a network's inability to acquire the unlicensed channel. On the other hand, monitoring extra PDCCH occasions in a PO is wasteful in terms of UE power consumption in low channel occupancy instances, given that the network can more reliably acquire the channel in a first PDCCH monitoring occasion of a PO.

To support monitoring such additional PDCCH monitoring occasions without adversely affecting power consumption, a current discussion agrees that if a UE receives a PDCCH addressed to a P-RNTI in a PDCCH monitoring occasion for paging corresponding to an SSB in a PO, the UE is not required to monitor subsequent PDCCH monitoring occasions corresponding to the SSB in the PO. This reduces superfluous PDCCH monitoring occasions in a dynamic manner that matches the ability of the network to acquire the channel to transmit paging messages.

However, for this to be effective in reducing UE power consumption, a gNB should transmit a PDCCH with P-RNTI for all the gNB's served UEs in every paging occasion. Otherwise at least some UEs will be wasting power monitoring unnecessary PDCCH monitoring occasions. Limiting the stopping behavior to PDCCH addressed to P-RNTI can therefore lead to either an increase in signaling or sub-optimal UE power savings.

Therefore, some embodiments of the present disclosure propose an apparatus (such as a user equipment (UE) and/or a base station) and a method of wireless communication, which can solve issues in the prior art, improve an issue of increasing in signaling or sub-optimal UE power savings, provide a good communication performance, and/or provide high reliability.

FIG. 1 illustrates that, in some embodiments, one or more user equipments (UEs) 10 and a base station (e.g., gNB or eNB) 20 for wireless communication in a communication network system 30 according to an embodiment of the present disclosure are provided.

The communication network system 30 includes the one or more UEs 10 and the base station 20. The one or more UEs 10 may include a memory 12, a transceiver 13, and a processor 11 coupled to the memory 12 and the transceiver 13.

The base station 20 may include a memory 22, a transceiver 23, and a processor 21 coupled to the memory 22 and the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21.

The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device.

The memory 12 or 22 may include read-only memory (ROM), random access memory (RAM), flash memory, memory card, storage medium and/or other storage device.

The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21.

The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured with one or more additional paging monitoring occasions from the base station 20 and if the processor 11 detects a radio network temporary identifier (RNTI) addressed downlink channel in a downlink channel paging monitoring occasion from the base station 20, the processor 11 determines whether to stop monitoring the one or more additional paging monitoring occasions. This can solve issues in the prior art, improve an issue of increasing in signaling or sub-optimal UE power savings, provide a good communication performance, and/or provide high reliability.

In some embodiments, the processor 21 is configured to configure one or more additional paging monitoring occasions to the user equipment (UE) 10 and if the UE 10 detects a radio network temporary identifier (RNTI) addressed downlink channel in a downlink channel paging monitoring occasion from the base station 20, the UE 10 determines whether to stop monitoring the one or more additional paging monitoring occasions. This can solve issues in the prior art, improve an issue of increasing in signaling or sub-optimal UE power savings, provide a good communication performance, and/or provide high reliability. In some embodiments, the transceiver 23 doesn't need to transmit the RNTI addressed downlink channel for all served UEs 10 in every paging monitoring occasion.

Figure 2:
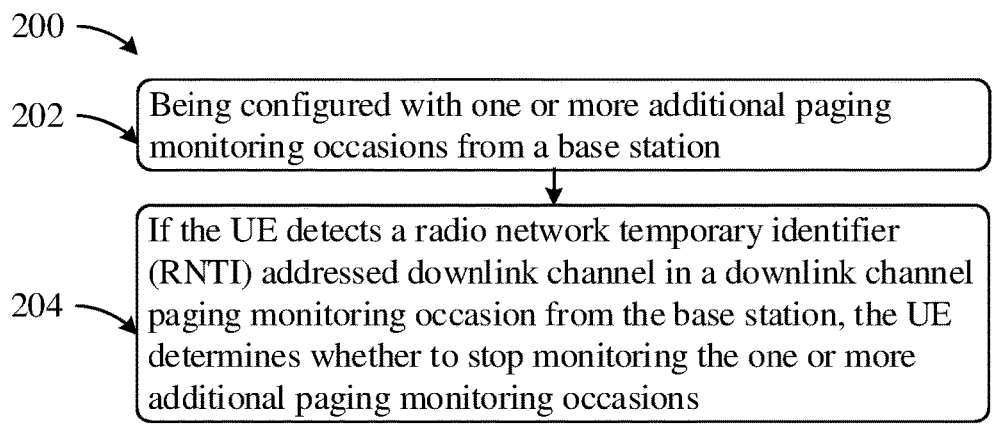
FIG. 2 is a flowchart illustrating a method of wireless communication performed by a user equipment (UE) according to an embodiment of the present disclosure.

FIG. 2 illustrates a method 200 of wireless communication by a user equipment (UE) according to an embodiment of the present disclosure.

In some embodiments, the method 200 includes: a block 202, being configured with one or more additional paging monitoring occasions from a base station, and a block 204, if the UE detects a radio network temporary identifier (RNTI) addressed downlink channel in a downlink channel paging monitoring occasion from the base station, the UE determines whether to stop monitoring the one or more additional paging monitoring occasions. This can solve issues in the prior art, improve an issue of increasing in signaling or sub-optimal UE power savings, provide a good communication performance, and/or provide high reliability.

Figure 3:
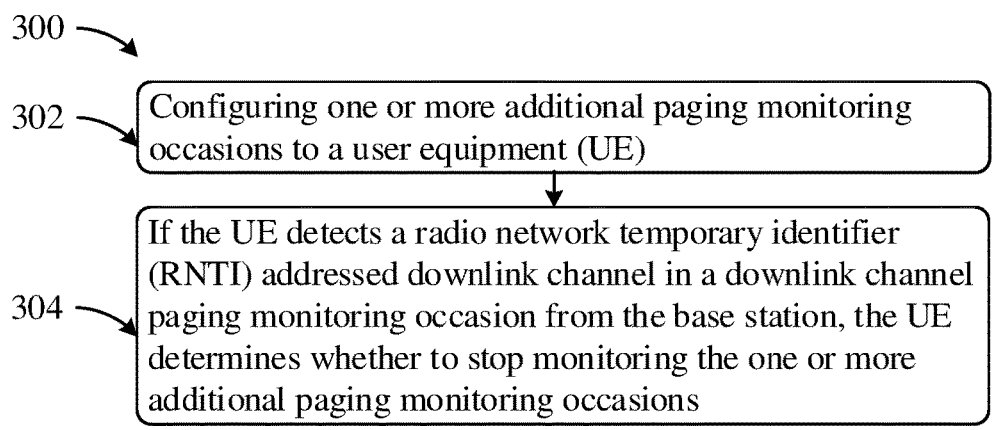
FIG. 3 is a flowchart illustrating a method of wireless communication performed by a base station according to an embodiment of the present disclosure.

FIG. 3 illustrates a method 300 of wireless communication by a base station according to an embodiment of the present disclosure.

In some embodiments, the method 300 includes: a block 302, configuring one or more additional paging monitoring occasions to a user equipment (UE), and a block 304, if the UE detects a radio network temporary identifier (RNTI) addressed downlink channel in a downlink channel paging monitoring occasion from the base station, the UE determines whether to stop monitoring the one or more additional paging monitoring occasions. This can solve issues in the prior art, improve an issue of increasing in signaling or sub-optimal UE power savings, provide a good communication performance, and/or provide high reliability. In some embodiments, the base station doesn't need to transmit the RNTI addressed downlink channel for all served UEs in every paging monitoring occasion.

In some embodiments, the UE detecting the RNTI addressed downlink channel in the downlink channel paging monitoring occasion from the base station comprises receiving a downlink control information (DCI) of the RNTI addressed downlink channel from the base station.

In some embodiments, the RNTI addressed downlink channel comprises a paging RNTI (P-RNTI) addressed physical downlink control channel (PDCCH).

In some embodiments, the DCI of the RNTI addressed downlink channel comprises a DCI format 1_0 with cyclic redundancy check (CRC) scrambled by P-RNTI.

In some embodiments, the DCI of the RNTI addressed downlink channel comprises a short message, and the short message indicates whether the UE needs to stop monitoring the one or more additional paging monitoring occasions. In some embodiments, a paging message scheduled by the RNTI addressed downlink channel indicates whether the UE needs to stop monitoring the one or more additional paging monitoring occasions.

In some embodiments, the DCI of the RNTI addressed downlink channel comprises at least one of the followings: a short message indicator; or one or more short messages.

In some embodiments, the short message indicator comprises 2 bits.

In some embodiments, 2 bits of the short message indicator indicate at least one of the followings: reserved; only a scheduling information for paging is present in the DCI; only the short message is present in the DCI; or both the scheduling information for paging and the short message are present in the DCI. In some embodiments, reserved comprises if only the scheduling information for paging is carried, a bit field of the short message indicator is reserved. In some embodiments, the scheduling information for paging comprises the paging message.

In some embodiments, the one or more short messages are transmitted on the PDCCH using the P-RNTI with or without an associated paging message using a short message field in the DCI format 1_0.

In some embodiments, the one or more short messages comprise 8 bits. In some embodiments, 8 bits of the one or more short messages indicate at least one of the followings: a system information modification; an earthquake and tsunami warning system (ETWS) and/or commercial mobile alert system (CMAS) indication; or not used and is ignored by the UE if received.

In some embodiments, a bit 1 of the one or more short messages indicates the system information modification comprising if set to 1, an indication of a broadcast control channel (BCCH modification other than a system information block 6 (SIB6), a SIB7, and a SIB8.

In some embodiments, a bit 2 of the one or more short messages indicates the ETWS and/or CMAS indication comprising if set to 1, an indication of an ETWS primary notification and/or an ETWS secondary notification and/or a CMAS notification.

In some embodiments, bits 3, 4, 5, 6, 7, and 8 of the one or more short messages indicate not used and is ignored by the UE if received.

In some embodiments, one or several bits of the one or more short messages are used to indicate whether the UE needs to stop monitoring the one or more additional paging monitoring occasions.

In some embodiments, if the UE does not detect a paging identity in the paging message, the UE checks the one or several bits of the one or more short messages.

In some embodiments, if the one or several bits of the one or more short messages indicate the UE to monitor the one or more additional paging monitoring occasions, the UE continues monitoring the one or more additional paging monitoring occasions; or otherwise the UE does not monitor the one or more additional paging monitoring occasions.

In some embodiments, when the UE receives the DCI of P-RNTI addressed PDCCH comprising the short message indicator, the short message indicator indicates there is the paging message and the one or more short messages.

In some embodiments, when the UE receives the DCI of P-RNTI addressed PDCCH comprising the short message indicator, the short message indicator indicates there is the paging message only.

In some embodiments, if the UE does not detect a paging identity in the paging message, the UE checks an indication in the paging message scheduled by the P-RNTI addressed PDCCH.

In some embodiments, if the indication in the paging message scheduled by the P-RNTI addressed PDCCH indicates the UE to monitor the one or more additional paging monitoring occasions, the UE continues monitoring the one or more additional paging monitoring occasions; or otherwise the UE does not monitor the one or more additional paging monitoring occasions.

There are other signals/channels that can be detected with similar reliability to a DCI with CRC scrambled with a P-RNTI (e.g., PDCCHs with CRC scrambled with other RNTIs). Therefore, a UE detecting a PDCCH addressed to other RNTIs can be useable to determine that a gNB acquires an unlicensed channel in a paging occasion (PO). Upon detection of a PDCCH addressed to other RNTIs, the UE could not be required to monitor subsequent PDCCH monitoring occasions in the PO.

Example

A UE can determine whether the UE should stop monitoring additional paging monitoring occasions when the UE detects a P-RNTI addressed PDCCH, and an included short message in a DCI can indicate whether the UE needs to stop monitoring additional paging monitoring occasion. This can solve issues in the prior art, improve an issue of increasing in signaling or sub-optimal UE power savings, provide a good communication performance, and/or provide high reliability.

Example

A UE can determine whether the UE should stop monitoring additional paging monitoring occasions when the UE detects a P-RNTI addressed PDCCH, and a paging message scheduled by the P-RNTI addressed PDCCH can indicate whether the UE needs to stop monitoring additional paging monitoring occasion. This can solve issues in the prior art, improve an issue of increasing in signaling or sub-optimal UE power savings, provide a good communication performance, and/or provide high reliability.

For a base station (e.g., gNB), according to embodiments described in the previous examples, the gNB doesn't have to transmit a PDCCH with P-RNTI for all served UEs in every paging occasion, and in such case, increasing in signaling or sub-optimal UE power savings may be avoided.

Example

A UE can determine whether the UE should stop monitoring additional paging monitoring occasions when the UE detects a P-RNTI addressed PDCCH, and an included short message in a DCI can indicate whether the UE needs to stop monitoring additional paging monitoring occasion. This can solve issues in the prior art, improve an issue of increasing in signaling or sub-optimal UE power savings, provide a good communication performance, and/or provide high reliability.

The DCI of P-RNTI addressed PDCCH include the following fields: The following information is transmitted by means of the DCI format 1_0 with CRC scrambled by P-RNTI:

Short message indicator: 2 bits, according to Table 1.

Short Messages: 8 bits. If only a scheduling information for paging (such as a paging message) is carried, this bit field is reserved.

The 2 bits short message indicator is illustrated in Table 1.

TABLE 1

| Bit field | Short Message indicator |
|---|---|
| 00 | Reserved |
| 01 | Only scheduling information for paging is present in the DCI |
| 10 | Only short message is present in the DCI |
| 11 | Both scheduling information for paging and short message are present in the DCI |

In this case, the UE can receive a DCI of P-RNTI addressed PDCCH, which include the short message indicator, the short message indicator indicates there is scheduling message information (paging message) and short message (8 bits). The meaning of 8-bits short message includes the following. Short messages can be transmitted on PDCCH using P-RNTI with or without an associated paging message using a short message field in DCI format 1_0.

Table 2 or Table 3 defines short Messages. Bit 1 is the most significant bit.

TABLE 2

Short Messages

| Bit | Short Message |
|---|---|
| 1 | systemInfoModification<br>If set to 1: indication of a BCCH modification other than SIB6, SIB7 |

TABLE 2-continued

Short Messages

| Bit | Short Message |
|---|---|
| | and SIB8. |
| 2 | etwsAndCmasIndication<br>If set to 1: indication of an ETWS primary notification and/or an ETWS secondary notification and/or a CMAS notification. |
| 3-8 | Not used in this release of the specification and shall be ignored by UE if received. |

TABLE 3

Short Messages

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |
| 3 | stopPagingMonitoring<br>This bit can be used for only operation with shared spectrum channel access and if nrofPDCCH-MonitoringOccasionPerSSB-InPO is present.<br>If set to 1: indication that the UE may stop monitoring PDCCH occasion(s) for paging in this paging occasion. |
| 4-8 | Not used in this release of the specification and shall be ignored by UE if received. |

One or several bits of the short message can be used for indicating whether the UEs should continue monitoring additional paging occasion or not. For example, some example can use the bit 3 (which is currently not used) in the short message to indicate whether the UEs should continue monitoring additional paging monitoring occasion or not. It should be noted that the bit 3 is merely for illustration but not intended for limitation. Some embodiments can also use other bit in the short message for indication.

For the UE, if the UE does not detect a paging identity in a scheduling message (paging message), the UE will check the bit 3 of the short message in the DCI of P-RNTI addressed PDCCH. If the bit indicates UE should monitoring additional paging occasion, the UE should continue monitoring, otherwise it does not monitor additional paging monitoring occasions.

Example

A UE can determine whether the UE should stop monitoring additional paging monitoring occasions when the UE detects a P-RNTI addressed PDCCH, and a paging message scheduled by the P-RNTI addressed PDCCH can indicate whether the UE needs to stop monitoring additional paging monitoring occasion. This can solve issues in the prior art, improve an issue of increasing in signaling or sub-optimal UE power savings, provide a good communication performance, and/or provide high reliability.

The DCI of P-RNTI addressed PDCCH include the following fields: The following information is transmitted by means of the DCI format 1_0 with CRC scrambled by P-RNTI:

Short message indicator: 2 bits, according to Table 1.

Short Messages: 8 bits. If only a scheduling information for paging (such as a paging message) is carried, this bit field is reserved.

The 2 bits short message indicator is illustrated in Table 1.

In this case, the UE can receive a DCI of P-RNTI addressed PDCCH, which include the short message indicator, the short message indicator indicates there is scheduling message information (paging message) and short message (8 bits), or there is scheduling message information (paging message) only.

Figure 4:
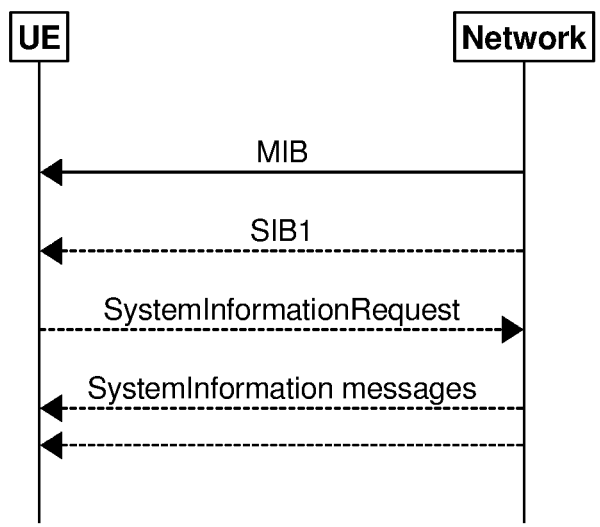
FIG. 4 is a schematic diagram illustrating a system information (SI) acquisition according to an embodiment of the present disclosure.

FIG. 4 illustrates a system information (SI) acquisition according to an embodiment of the present disclosure. FIG. 4 illustrates that, in some embodiments, system information (SI) in new radio (NR) includes a master information block (MIB) and a number of SIBs, which are divided into minimum SI and other SI. Minimum SI carries basic information required for initial access and for acquiring any other SI. Minimum SI includes MIB and SIB1. For a UE to be allowed to camp on a cell, the UE should have acquired the contents of the minimum SI from a cell. Other SI includes all SIBs not broadcast in the minimum SI. The UE does not need to receive these SIBs before accessing the cell.

Other SI is also known as On-Demand SI because a gNB transmits/broadcasts these SIBs when explicitly requested by UE(s). The UE should acquire SI upon cell selection (e.g. upon power on), cell-reselection, return from out of coverage, after reconfiguration with sync completion, after entering a network from another radio access technology (RAT), upon receiving an indication that the SI has changed, upon receiving a public warning system (PWS) notification and whenever the UE does not have a valid version of a stored SIB. MIB is mapped on to BCCH logical channel and is carried on BCH transport channel. BCH is then mapped on to PBCH. MIB provides the UE with parameters (e.g. CORESET #0 configuration) required to acquire SIB1, more specifically, information required for monitoring of PDCCH for scheduling PDSCH that carries SIB1. SIB1 carries the most critical information required for the UE to access the cell e.g., random access parameters.

Other SI encompasses all SIB s not broadcast in the Minimum SI. It is not mandatory for the UE to receive these SIBs before accessing the cell. Other SI messages are mapped to BCCH logical channel and either periodically broadcast on DL-SCH or broadcast on-demand on DL-SCH (i.e. upon request from UEs in RRC_IDLE or RRC_INACTIVE) or sent in a dedicated manner on DL-SCH to UEs in RRC_CONNECTED.

The paging message as illustrated in Table 4 is used for the notification of one or more UEs. Signaling radio bearer: Not applicable (N/A). Radio link control subsystem application part (RLC-SAP): Transparent mode (TM). Logical channel: paging control channel (PCCH). Direction: Network to UE.

TABLE 4

Paging message

```
-- TAG-PAGING-START
Paging ::=                    SEQUENCE {
    pagingRecordList              PagingRecordList
```

TABLE 4-continued

| Paging message | |
|---|---|
| OPTIONAL, -- Need N | |
| lateNonCriticalExtension | OCTET STRING |
| OPTIONAL, | |
| continueMonitoringPaing | Boolean |
|     nonCriticalExtension | SEQUENCE{ } |
| OPTIONAL | |
| } | |
| PagingRecordList ::= | SEQUENCE (SIZE(1..maxNrofPageRec)) OF |
| PagingRecord | |
| PagingRecord ::= | SEQUENCE { |
|     ue-Identity | PagingUE-Identity, |
|     accessType | ENUMERATED {non3GPP} |
| OPTIONAL, -- Need N | |
|     ... | |
| } | |
| PagingUE-Identity ::= | CHOICE { |
|     ng-5G-S-TMSI | NG-5G-S-TMSI, |
|     fullI-RNTI | I-RNTI-Value, |
|     ... | |
| } | |
| -- TAG-PAGING-STOP | |
| -- ASN1STOP | |

In the paging message, an indication can be added to indicate whether the UE should keep monitoring additional paging monitoring occasions or not. For the UE, if the UE does not detect the paging identity in the scheduling message (paging message), the UE will check this indication (e.g., continueMonitoringPaing) in the paging message scheduled by P-RNTI addressed PDCCH.

If the indication indicates UE should monitoring additional paging occasion, the UE should continue monitoring, otherwise the UE does not monitor additional paging monitoring occasions. It should be noted that the "continueMonitoringPaing" is merely an example expression but not intended for limitation. Some embodiments can also use other expression for this indication.

Commercial interests for some embodiments are as follows. 1. Solving issues in the prior art. 2. Improving an issue of increasing in signaling or sub-optimal UE power savings. 3. Providing a good communication performance. 4. Providing a high reliability. 5.

Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of "techniques/processes" that can be adopted in 3GPP specification to create an end product. Some embodiments of the present disclosure could be adopted in the 5G NR unlicensed band communications. Some embodiments of the present disclosure propose technical mechanisms.

Figure 5:
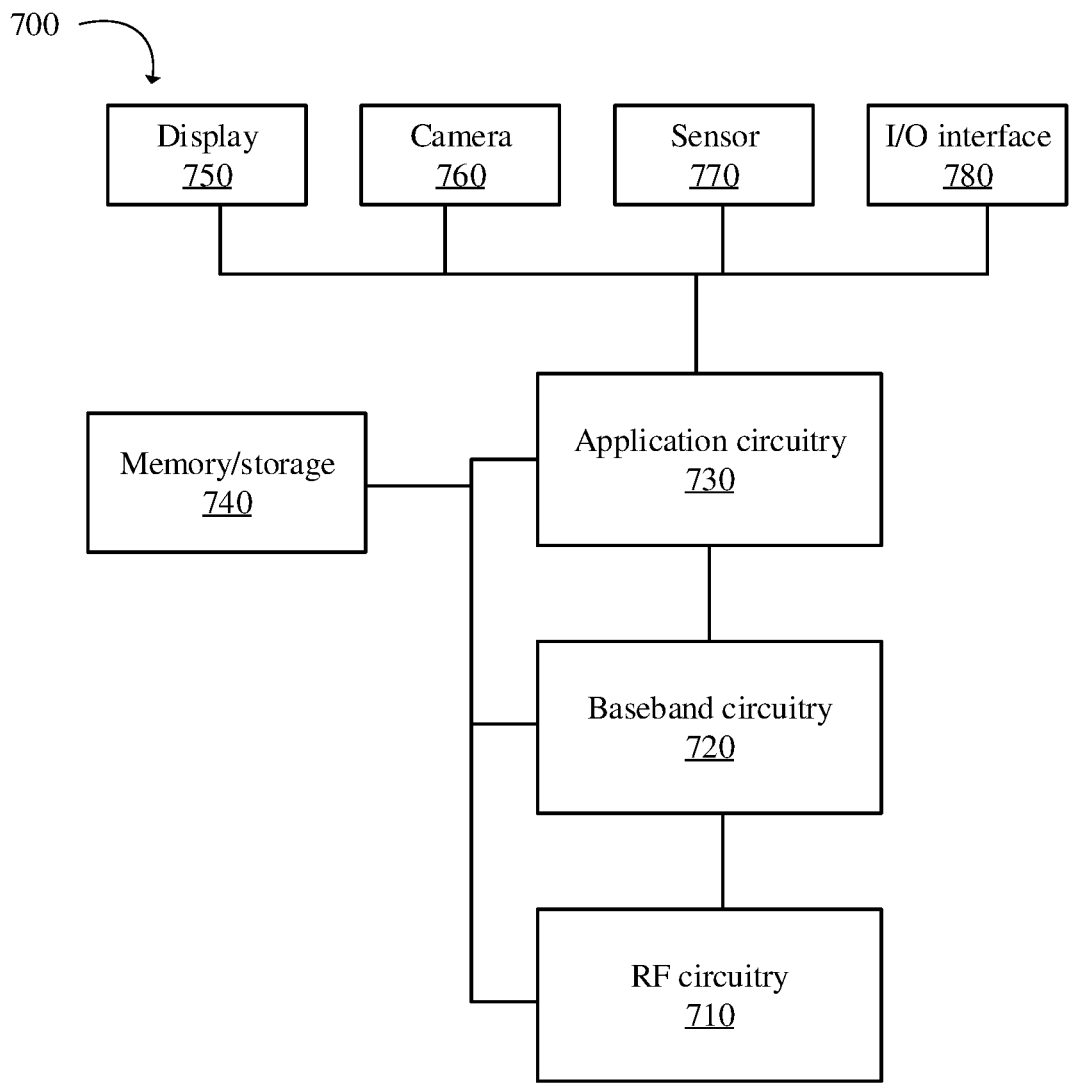
FIG. 5 is a block diagram of a system for wireless communication according to an embodiment of the present disclosure.

FIG. 5 is a block diagram of an example system 700 for wireless communication according to an embodiment of the present disclosure. Embodiments described herein may be implemented into the system using any suitably configured hardware and/or software. FIG. 5 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors.

The processors may include any combination of general-purpose processors and dedicated processors, such as graphics processors, application processors.

The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies.

For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency.

For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency.

For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, an AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped.

On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A wireless communication method by a user equipment (UE), comprising:
being configured for one or more additional physical downlink control channel (PDCCH) monitoring occasions by a base station; and
if the UE receives a downlink control information (DCI) on a PDCCH addressed with a paging radio network temporary identifier (P-RNTI) in a paging occasion (PO), and the DCI comprises a short message, determining whether the UE needs to stop monitoring subsequent PDCCH monitoring occasion(s) in the PO based on the short message;

wherein one of the followings is included in the DCI:

only the short message; or both scheduling information for paging and the short message;

wherein the short message comprises 8 bits, and a third bit of the 8 bits in the short message is used to indicate whether the UE should continue monitoring the one or more additional PDCCH monitoring occasions.

2. The method of claim 1, wherein each PO corresponds to a synchronization signal block (SSB), and each PO includes the one or more additional PDCCH monitoring occasions.

3. A wireless communication method by a base station, comprising:

configuring one or more additional physical downlink control channel (PDCCH) monitoring occasions to a user equipment (UE); and indicating whether the UE needs to stop monitoring subsequent PDCCH monitoring occasion(s) in a paging occasion (PO), wherein the indication is carried by a short message of a downlink control information (DCI) on a PDCCH addressed with a paging radio network temporary identifier (P-RNTI) in the PO;

wherein one of the followings is included in the DCI:

only the short message; or both scheduling information for paging and the short message;

wherein the short message comprises 8 bits, and a third bit of the 8 bits in the short message is used to indicate whether the UE should continue monitoring the one or more additional PDCCH monitoring occasions.

4. The method of claim 3, wherein each PO corresponds to a synchronization signal block (SSB), and each PO includes the one or more additional PDCCH monitoring occasions.

5. A user equipment (UE), comprising:

a memory;

a transceiver; and a processor coupled to the memory and the transceiver;

wherein the processor is configured for one or more additional physical downlink control channel (PDCCH) monitoring occasions by a base station; and if the processor receives a downlink control information (DCI) on a PDCCH addressed with a paging radio network temporary identifier (P-RNTI) in a paging occasion (PO), and the DCI comprises a short message, the processor determines whether the processor needs to stop monitoring subsequent PDCCH monitoring occasions occasion(s) in the PO based on the short message;

wherein one of the followings is included in the DCI:

only the short message; or both scheduling information for paging and the short message;

wherein the short message comprises 8 bits, and a third bit of the 8 bits in the short message is used to indicate whether the UE should continue monitoring the one or more additional PDCCH monitoring occasions.

6. The UE of claim 5, wherein each PO corresponds to a synchronization signal block (SSB), and each PO includes the one or more additional PDCCH monitoring occasions.

7. The UE of claim 5, wherein the DCI comprises a DCI format 1_0 with cyclic redundancy check (CRC) scrambled by P-RNTI.

* * * * *